(12) United States Patent
Dohta

(10) Patent No.: US 6,591,822 B2
(45) Date of Patent: Jul. 15, 2003

(54) AIR-FUEL RATIO CONTROLLER OF INTERNAL COMBUSTION ENGINES

(75) Inventor: Hisayo Dohta, Chiryu (JP)

(73) Assignee: Denso Corporation, Kariya (JP)

( * ) Notice: Subject to any disclaimer, the term of this patent is extended or adjusted under 35 U.S.C. 154(b) by 110 days.

(21) Appl. No.: 09/880,127

(22) Filed: Jun. 14, 2001

(65) Prior Publication Data

US 2002/0005192 A1 Jan. 17, 2002

(30) Foreign Application Priority Data

Jun. 20, 2000 (JP) ........................................ 2000-189734

(51) Int. Cl.$^7$ ............................................... F02D 41/14
(52) U.S. Cl. ....................................... 123/672; 701/104
(58) Field of Search ................................ 123/672, 674, 123/703; 701/103, 104, 109

(56) References Cited

U.S. PATENT DOCUMENTS

| 5,445,136 A | | 8/1995 | Yamashita et al. | |
|---|---|---|---|---|
| 5,606,959 A | * | 3/1997 | Maki et al. | ................. 123/673 |
| 5,611,315 A | | 3/1997 | Dohta et al. | |
| 5,720,265 A | * | 2/1998 | Maki et al. | ................. 123/680 |
| 5,758,630 A | * | 6/1998 | Maki et al. | ................. 123/673 |
| 5,983,875 A | * | 11/1999 | Kitagawa et al. | ........... 123/674 |

FOREIGN PATENT DOCUMENTS

| JP | 7-103097 | 4/1995 |
|---|---|---|
| JP | 11-247734 | 9/1999 |

* cited by examiner

*Primary Examiner*—Mahmoud Gimie
(74) *Attorney, Agent, or Firm*—Nixon & Vanderhye P.C.

(57) ABSTRACT

For a control model which simulates a control object ranging from the fuel injection valve up to the air-fuel ratio sensor, coefficients of a characteristic polynomial of the control model are calculated based on the pole arrangement scheme, with roots equal in number to the dead time of the control model being made 0, control parameters are calculated from the coefficients of the characteristic polynomial and from model parameters, and the air-fuel ratio correction factor is calculated from the control parameters. The control model is expressed in terms of a dead time plus first-order lag system, with the total number of roots being set greater by two than the number n of roots which are derived from the time lag, and unknown roots other than those of the dead time are solved based on formulas which are expressed in terms of a second-order lag system.

36 Claims, 4 Drawing Sheets

AIR-FUEL RATIO CONTROLLER OF INTERNAL COMBUSTION ENGINES

CROSS REFERENCE TO RELATED APPLICATION

This application is based on and incorporates herein by reference Japanese Patent Application No. 2000-189734 filed on Jun. 20, 2000.

BACKGROUND OF THE INVENTION

1. Field of the Invention

The present invention relates to an air-fuel ratio controller or an internal combustion engine, which controller controls the amount of fuel injection.

2. Description of Related Art

In recent automobiles, a three-way catalytic converter is located in the exhaust pipe for the cleaning of exhaust gas, and an air-fuel ratio sensor also is located on the upstream side of the catalytic converter to determine the amount of fuel injection based on state feedback for bringing the air-fuel ratio of the exhaust gas close to a purification window (around theoretical ideal air-fuel ratio) in response to output of the air-fuel ratio sensor, so that exhaust gas is cleaned efficiently. The air-fuel ratio control is generally based on a model system of the controlled object ranging from the fuel injection valve down to the air-fuel ratio sensor to calculate feedback gain of the system with an optimizing regulator, to calculate an air-fuel ratio correction factor by using the calculated feedback again, and to correct a base fuel injection amount, which has been determined from the operational states of the engine, in response to the calculated air-fuel ratio correction factor, etc., thereby determining the amount of fuel injection, as described in JP-A-7-11995.

The above-described conventional air-fuel ratio control repeats the calculation of feedback gain with the optimizing regulator by varying the weighting parameters Q and R of the criterion function J so that the value of J is minimum at which the optimal control characteristics are obtained. Thus, it is necessary to calculate values of feedback gain in advance to cope with the difficulty of calculating the feedback gain by an on-line real-time process. On this account, it cannot vary the feedback gain continuously in accordance with the operational states of the engine, but has to control the fuel injection at a smaller feedback gain for the sake of control stability, thereby resulting unfavorably in a degraded accuracy of air-fuel ratio control.

SUMMARY OF THE INVENTION

An object of the present invention is to provide an air-fuel ratio controller for internal combustion engines which is capable of calculating the control parameters of air-fuel ratio control by an on-line real-time process, thereby varying control parameters continuously in response to operational states of the engine and thus improving control accuracy of air-fuel ratio.

According to the present invention, an inventive air-fuel ratio controller is designed to calculate coefficients of a characteristic polynomial of a control model which simulates the controlled object ranging from the fuel injection valve down to the air-fuel ratio detecting means based on a pole arrangement scheme which makes roots, which are equal in number to the dead time of the control model or equal in number to n−1 or n−2 (where n is the degree of the characteristic polynomial), to be zero, calculate control parameters based on coefficients of the characteristic polynomial of the control model and model parameters with a control parameter calculating means, and calculate from the control parameters an air-fuel ratio correction factor with an air-fuel ratio correction factor calculation means.

Calculating coefficients of the characteristic polynomial of the control model based on a pole arrangement scheme which makes roots, which are equal in number to the dead time of the control model or equal in number to n−1 or n−2 to be zero, enables calculation of coefficients of the characteristic polynomial and revision of control parameters by an on-line real-time process. In consequence, it becomes possible to vary control parameters continuously in response to operational states of the engine, thereby improving control accuracy of the air-fuel ratio.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENT

Figure 1:
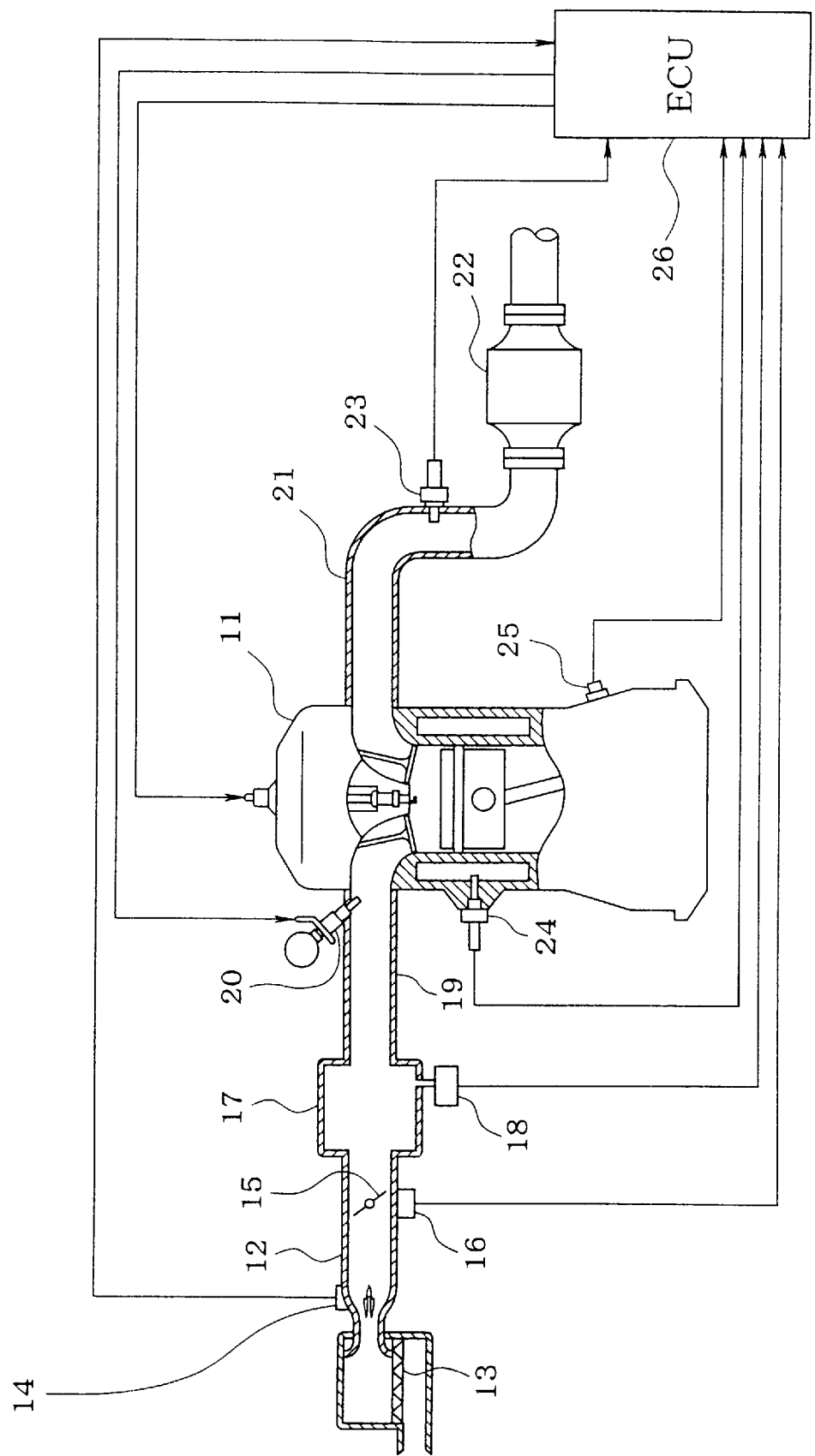
FIG. 1 is a schematic view showing an engine control system based on an embodiment of the present invention.

An entire structure of a whole engine control system will be explained with reference to FIG. 1. An internal combustion engine 11 has an air cleaner 13 which is located at the most upstream section of an intake pipe 12, and an air flow meter 14 which is located on the downstream side of the air cleaner 13 for detecting the amount of intake air. Disposed on the downstream side of the air flow meter 14 are a throttle valve 15 and a throttle angle sensor 16 for detecting the throttle angle.

Further, a surge tank 17 is disposed on the downstream side of the throttle valve. The surge tank 17 has the attachment of an intake pipe pressure sensor 18 detecting the air pressure in the intake pipe 12. The surge tank 17 is followed by an intake manifold 19 for introducing air to the cylinders of the engine 11, and on the intake manifold 19 at its positions close to the inlet ports of the cylinders, there are disposed fuel injection valves 20.

The engine 11 also has on an exhaust pipe 21 a catalytic converter 22, such as a three-way catalytic converter, for reducing toxic components (GO, HG, $NO_x$, etc.) of the exhaust gas. An air-fuel ratio sensor 23 (air-fuel ratio detecting means) is disposed on the upstream side of catalytic converter 22, such as a linear A/F sensor, which detects the air-fuel ratio of the exhaust gas. The engine 11 has on its cylinder block the attachment of a cooling water temperature sensor 24 for detecting the temperature of cooling water and a crank angle sensor 25 detecting rotational speed of engine 11.

These miscellaneous sensors have their outputs put into an engine control circuit (ECU) 26. The ECU 26 is formed principally of a microcomputer, and it controls the amount of fuel injection by the fuel injection valve 20 while running programs shown in FIGS. 2–5 which are stored in the internal ROM (memory device) to calculate the air-fuel ratio correction factor FAF based on the pole arrangement by state feedback.

The method of calculation of the air-fuel ratio correction factor FAF based on the pole arrangement by state feedback will be explained. In the present embodiment, the control object ranging from the fuel injection valve 20 down to the air-fuel ratio sensor 23 is simulated in terms of a control model having a dead time and a first-order lag expressed as follows.

$$\frac{OUTPUT}{INPUT} = \frac{\phi}{FAF} = \frac{1}{z^d} \cdot \frac{(\Delta t/\tau)z^{-1}}{1-(\Delta t/\tau)z^{-1}}$$

In the expression, $\phi$ represents a fuel excess ratio which is the reciprocal of an air excess ratio $\lambda$, i.e., $\phi=1/\lambda$, FAF is the air-fuel ratio correction factor, $\Delta t$ is a calculation period, $\tau$ is a model time constant, and d is the dead time. In the present embodiment, the dead time d is normalized by the calculation period, i.e., d is the dead time divided by the calculation period and evaluated to be an integer (d—dead time/calculation period).

Based on the above expression, the model is expressed as follows:

$$\phi(i+1) = ap \cdot \phi(i) + bp \cdot FAF(i-d)$$

$$ap = exp(-dt/\tau)$$

$$bp = 1 - ap$$

$$e(i) = \phi ref(i) - \phi(i)$$

where $\phi(i+1)$ is the fuel excess ratio of the next control routine, and $\phi(i)$ is the fuel excess ratio of the current control routine. FAF (i−d) is the air-fuel ratio correction factor of the time preceded by the dead time d from the present time, ap and bp are model parameters, dt is the calculation period, and $\tau$ is the model time constant. $\phi$ ref (i) is the target fuel excess ratio (target $\phi$ of the current control routine, and e(i) is the deviation of the fuel excess ratio $\phi$ (i) from the target fuel excess ratio $\phi$ ref (i) of the current control routine.

From the above model expression, the following algorithm of state feedback is effected.

$$FAF(i) = -F1 \cdot \phi(i) + DI(i) - F2 \cdot FAF(i-1) - F3 \cdot FAF(i-2) - F4 \cdot FAF(i-3) - F5 \cdot FAF(i-4) - F6 \cdot FAF(i-5) - F7 \cdot FAF(i-6)$$
$$= DI(i) - pr(i) - dI(i)$$

$$DI(i) = DI(i-1) + F0 \cdot e(i)$$

$$pr(i) = F1 \cdot \phi(i)$$

$$dI(i) = F2 \cdot FAF(i-1) + F3 \cdot FAF(i-2) + F4 \cdot FAF(i-3) + F5 \cdot FAF(i-4) + F6 \cdot FAF(i-5) + F7 \cdot FAF(i-6)$$

In the above expressions, F0 is the control parameter for the integral compensation term, F1 is the control parameter for the proportional compensation term, and F2 through F7 are control parameters for the dead time compensation term. DI(i) is the integral compensation term, pr(i) is the proportional compensation term, and dl(i) is the dead time compensation term. FAF(i) is the air-fuel ratio correction factor of the current control routine, FAF(i−1) through FAF(i−6) are air-fuel ratio correction factors of the time preceded by one through six control routines, respectively, from the current control routine. Here, this control algorithm is an example of the case where the normalized dead time d is 6.

The model expression in terms of the state values is as follows.

$$\begin{pmatrix} \phi(i+1) \\ FAF(i) \\ FAF(i-1) \\ FAF(i-2) \\ FAF(i-3) \\ FAF(i-4) \\ FAF(i-5) \\ e(i+1) \end{pmatrix} = \begin{pmatrix} ap & 0 & 0 & 0 & 0 & bp & 0 \\ 0 & 0 & 0 & 0 & 0 & 0 & 0 \\ 0 & 1 & 0 & 0 & 0 & 0 & 0 \\ 0 & 0 & 1 & 0 & 0 & 0 & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \\ (-ap) & 0 & 0 & 0 & 0 & (-bp) & 1 \end{pmatrix} \cdot \begin{pmatrix} \phi(i) \\ FAF(i-1) \\ FAF(i-2) \\ FAF(i-3) \\ FAF(i-4) \\ FAF(i-5) \\ FAF(i-6) \\ e(i) \end{pmatrix} + \begin{pmatrix} 0 \\ 1 \\ 0 \\ 0 \\ 0 \\ 0 \\ 0 \\ 0 \end{pmatrix} \cdot FAF(i)$$

This state value expression, with the control algorithm being involved, becomes as follows.

$$\begin{pmatrix} \phi(i+1) \\ FAF(i) \\ FAF(i-1) \\ FAF(i-2) \\ FAF(i-3) \\ FAF(i-4) \\ FAF(i-5) \\ e(i+1) \end{pmatrix} = \begin{pmatrix} ap & 0 & 0 & 0 & 0 & 0 & bp & 0 \\ (-F1) & (-F2) & (-F3) & (-F4) & (-F5) & (-F6) & (-F7) & F0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ (-ap) & 0 & 0 & 0 & 0 & 0 & (-bp) & 1 \end{pmatrix} \cdot \begin{pmatrix} \phi(i) \\ FAF(i-1) \\ FAF(i-2) \\ FAF(i-3) \\ FAF(i-4) \\ FAF(i-5) \\ FAF(i-6) \\ e(i) \end{pmatrix}$$

Among the two matrixes of the right side, the former matrix is defined to be matrix A' as follows.

$$A' = \begin{pmatrix} ap & 0 & 0 & 0 & 0 & 0 & bp & 0 \\ (-F1) & (-F2) & (-F3) & (-F4) & (-F5) & (-F6) & (-F7) & F0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ (-ap) & 0 & 0 & 0 & 0 & 0 & (-bp) & 1 \end{pmatrix}$$

From this matrix A', a matrix zE−A' for leading out the characteristic polynomial is expressed as follows.

$$zE - A' = \begin{pmatrix} (z-ap) & 0 & 0 & 0 & 0 & 0 & (-bp) & 0 \\ F1 & (z+F2) & F3 & F4 & F5 & F6 & F7 & (-F0) \\ 0 & (-1) & z & 0 & 0 & 0 & 0 & 0 \\ 0 & 0 & (-1) & z & 0 & 0 & 0 & 0 \\ 0 & 0 & 0 & (-1) & z & 0 & 0 & 0 \\ 0 & 0 & 0 & 0 & (-1) & z & 0 & 0 \\ 0 & 0 & 0 & 0 & 0 & (-1) & z & 0 \\ ap & 0 & 0 & 0 & 0 & 0 & bp & (z-1) \end{pmatrix}$$

Accordingly, the characteristic polynomial det(zE−A'), with the normalized dead time d being 6, is expressed as follows.

$$det(zE - A') = z^8 + (-ap + F2 - 1) \cdot z^7 +$$
$$\{-F2 \cdot (1+ap) + ap + F3\} \cdot z^6 +$$
$$\{F2 \cdot ap - F3 \cdot (ap+1) + F4\} \cdot z^5 +$$
$$\{F3 \cdot ap - F4 \cdot (ap+1) + F5\} \cdot z^4 +$$
$$\{F4 \cdot ap - F5 \cdot (ap+1) + F6\} \cdot z^3 +$$
$$\{F5 \cdot ap - F6 \cdot (ap+1) + F7\} \cdot z^2 +$$
$$\{F6 \cdot ap - F7 \cdot (ap+1) + F0 \cdot bp + F1 \cdot bp\} \cdot z^1 +$$
$$(F7 \cdot ap - F1 \cdot bp) \cdot z^0$$

When all coefficients of this characteristic polynomial det(zE−A') are known, the control parameters F0 through F7 can be calculated by simultaneous equations.

By replacing the coefficients of the characteristic polynomial det(zE−A') with A1 through A8, the det(zE−A') is expressed as follows.

$$det(zE-A')=z^8+A1 \cdot z^7+A2 \cdot z^6+A3 \cdot z^5+A4 \cdot z^4+A5 \cdot z^3+A6 \cdot z^2+A7 \cdot z^1+A8 \cdot z^0$$

where, $A1=-ap+F2-1$ $A2=-F2 \cdot (1+ap)+ap+F3$ $A3=F2 \cdot ap-F3 \cdot (ap+1)+F4$ $A4=F3 \cdot ap-F4 \cdot (ap+1)+F5$ $A5=F4 \cdot ap-F5 \cdot (ap+1)+F6$ $A6=F5 \cdot ap-F6 \cdot (ap+1)+F7$ $A7=F6 \cdot ap-F7 \cdot (ap+1)+F0 \cdot bp+F1 \cdot bp$ $A8=F7 \cdot ap-F1 \cdot bp$ Solving the simultaneous equations of A1–A8 for the control parameters F0–F7 results as follows.

$F2=A1+(ap+1)$ $F3=A2+(ap+1) \cdot F2-ap$ $F4=A3+(ap+1) \cdot F3-ap \cdot F2$ $F5=A4+(ap+1) \cdot F4-ap \cdot F3$ $F6=A5+(ap+1) \cdot F5-ap \cdot F4$ $F7=A6+(ap+1) \cdot F6-ap \cdot F5$ $F1=(ap \cdot F7-A8)/bp$ $F0=\{A7-bp \cdot F1+(ap+1) \cdot F7-ap \cdot F6\}/bp$ Since the control model of the present embodiment is expressed as a system having a dead time and a first-order lag and the normalized dead time d is 6 as mentioned previously, the characteristic polynomial det(zE−A') is of the degree of 8 which is greater by 2 than the dead time d.

Accordingly, the characteristic equation det(zE−A')=0 has eight roots, and the characteristic polynomial det(zE−A') is expressed by use of the eight roots r1 through r8 as follows.

$$det(zE - A') = (z-r1) \cdot (z-r2) \cdot (z-r3) \cdot$$
$$(z-r4) \cdot (z-r5) \cdot (z-r6) \cdot$$
$$(z-r7) \cdot (z-r8)$$

By knowing all of these eight roots r1–r8, all coefficients A1–A8 of the characteristic polynomial det(zE−A') can be known, so that all control parameters F0–F7 can be calculated.

Six roots for the dead time d out of the eight roots r1–r8 are 0, thereby remaining only two unknown roots. Assuming the unknown roots to be r1 and r2, since the remaining roots r3–r8 are all 0, the characteristic polynomial det(zE−A') is expressed as follows.

$$det(zE - A') = (z-0)^6 \cdot (z-r1) \cdot (z-r2)$$
$$= z^6 \cdot (z-r1) \cdot (z-r2)$$
$$= z^6 \cdot \{z^2 - (r1+r2) \cdot z + r1 \cdot r2\}$$
$$= z^8 - (r1+r2) \cdot z^7 + r1 \cdot r2 \cdot z^6$$
$$= z^8 + A1 \cdot z^7 + A2 \cdot z^6$$
$$= z^6 \cdot (z^2 + A1 \cdot z + A2)$$

where $A1 = -(r1+r2)$ $A2 = r1 \cdot r2$ where $A1=-(r1+r2)$ $A2=r1 \cdot r2$

This expression reveals that the six coefficients A3–A8 out of the eight coefficients A1–A8 of the characteristic polynomial det(zE−A') are all 0, thereby leaving only two coefficients A1 and A2 unknown. Accordingly, by attaining two coefficients A1 and A2 (roots r1 and r2), all control parameters F0–F7 can be calculated.

When the six coefficients A3–A8 for the dead time d out of the eight coefficients A1–A8 of the characteristic polynomial det(zE−A') are all 0, the formulas for calculating the control parameters F0–F7 are simplified as follows.

$$F2 = -A1 + (ap+1)$$

$$F3 = A2 + (ap+1) \cdot F2 - ap$$

$$F4 = (ap+1) \cdot F3 - ap \cdot F2$$

$$F5 = (ap+1) \cdot F4 - ap \cdot F3$$

$$F6 = (ap+1) \cdot F5 - ap \cdot F4$$

$$F7 = (ap+1) \cdot F6 - ap \cdot F5$$

$$F1 = ap \cdot F7 / bp$$

$$F0 = \{-bp \cdot F1 + (ap+1) \cdot F7 - ap \cdot F6\}/bp$$

In the present embodiment, for the calculation of the two coefficients A1 and A2 (roots r1 and r2), the equation $(z-r1)\cdot z - r2) = z^2 + A1 \cdot z + A2$ is expressed in terms of the denominator of the transfer function of a general second-order lag system.

The transfer function of a general second-order lag system is expressed by $\omega^2/(s^2 + 2\zeta \cdot \omega \cdot s + \omega^2)$, where $\zeta$ is the damping factor and $\omega$ is the natural frequency.

The denominator $s^2 + 2\zeta \cdot \omega \cdot s + \omega^2$ for a continuous system is expressed in terms of a discrete system as follows.

$$z^2 + 2(\zeta \cdot \omega \cdot dt - 1) \cdot z + \{1 + (\omega \cdot dt)^2 - 2\zeta \cdot \omega \cdot dt\} = z^2 + A1 \cdot z + A2$$

where $$A1 = 2(\zeta \cdot \omega \cdot dt - 1)$$

$$A2 = 1 + (\omega \cdot dt)^2 - 2\zeta \cdot \omega \cdot dt$$

Accordingly, the coefficients A1 and A2 can be calculated based on the damping factor $\zeta$, control gain (natural frequency) $\omega$ and calculation period dt. In case the damping factor $\zeta$ is smaller than 1, damping will be deficient, thereby causing the transitional response to be oscillatory and overshooting. In case the damping factor $\zeta$ is greater than 1, damping will be excessive in proportion to the value of $\zeta$, thereby causing a low response. In the case of $\zeta=1$, a high response without oscillation will be achieved. Therefore, in the present embodiment, the damping factor $\zeta$ is fixed to 1, and only the control gain $\omega$ is varied in accordance with the value of model's time constant $\tau$, for example. Generally, the greater the control gain $\omega$, the higher is the resulting control response.

Figure 2:
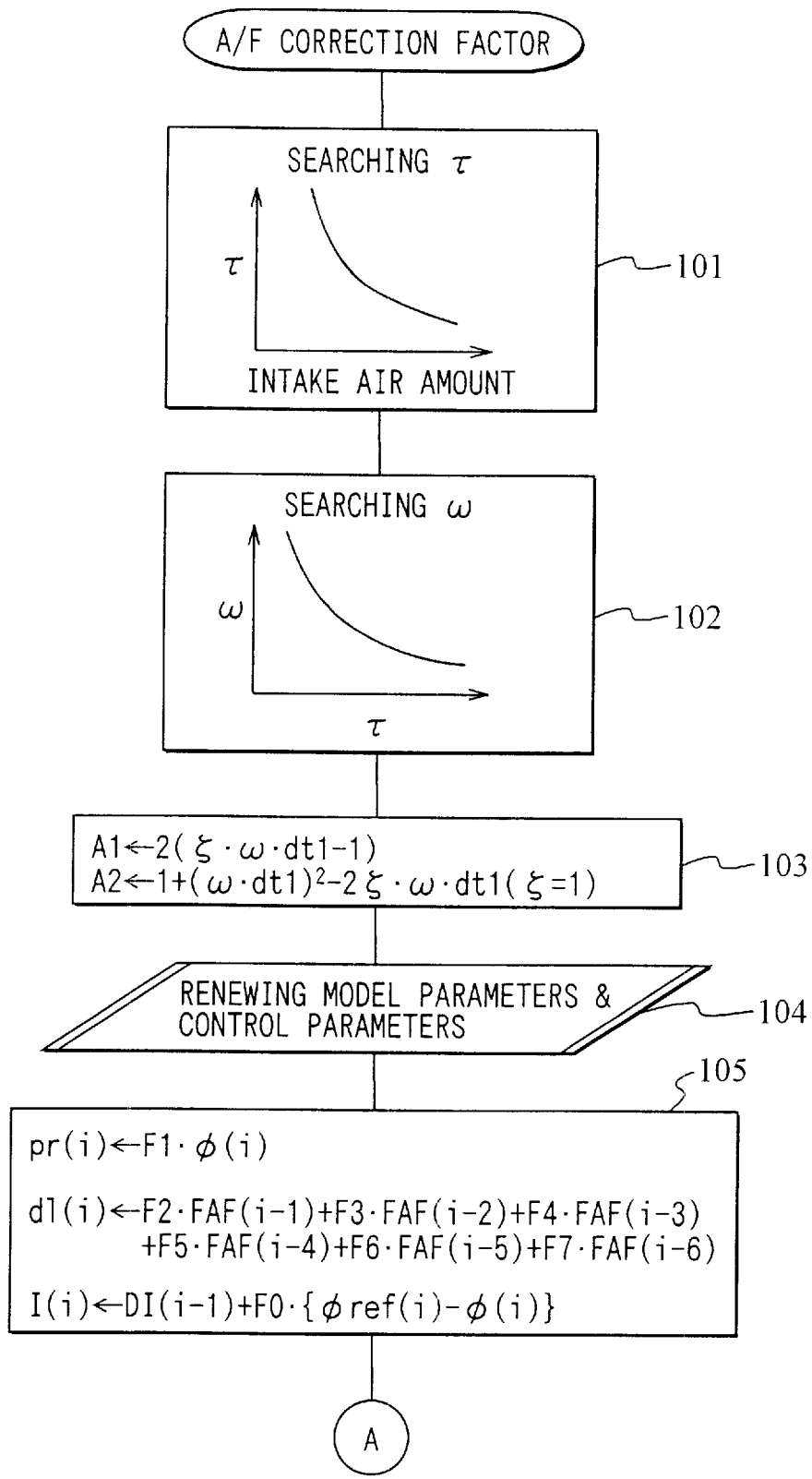
FIG. 2 is a flowchart showing an operation of the air-fuel ratio correction factor calculation program (part 1)
Figure 3:
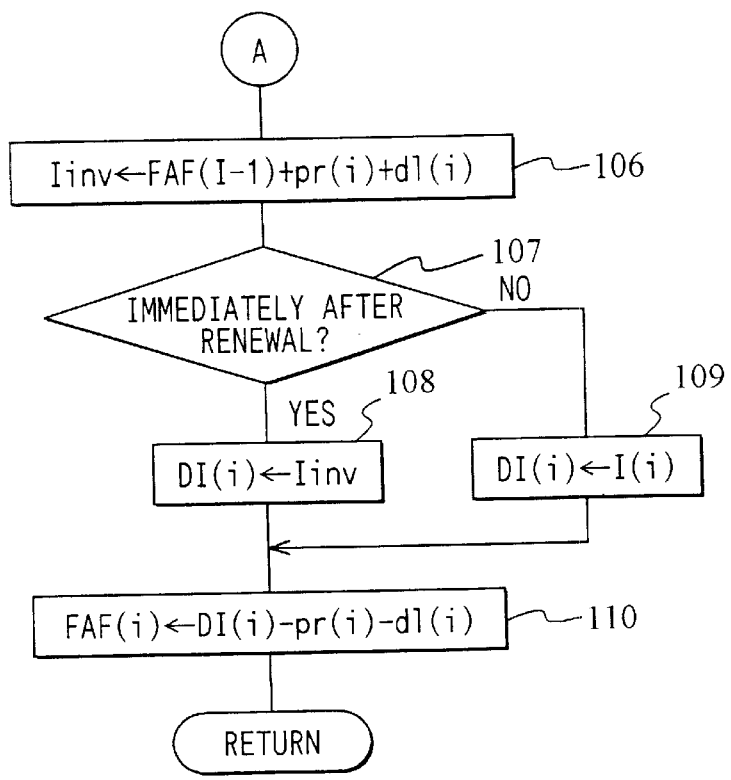
FIG. 3 is a flowchart showing the operation of the air-fuel ratio correction factor calculation program (part 2)
Figure 4:
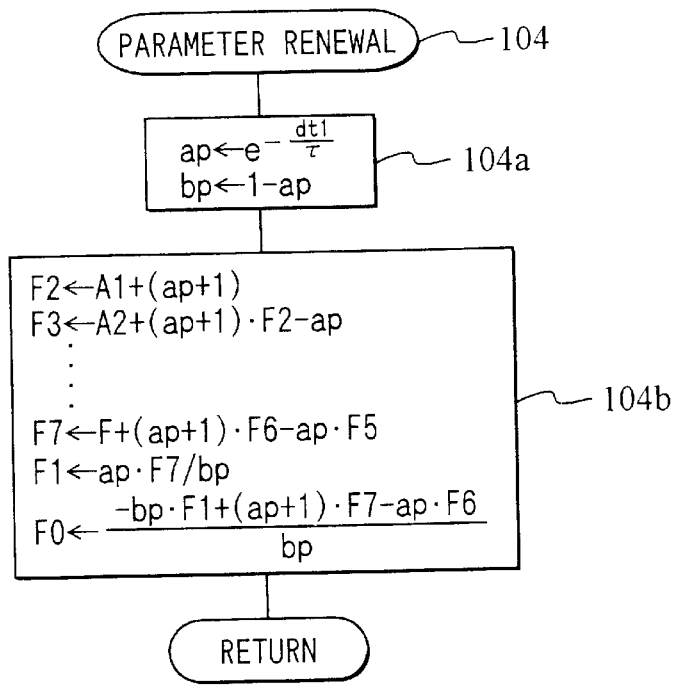
FIG. 4 is a flowchart showing an operation of parameter renewal program.

In the present embodiment, the ECU 26 executes the programs shown in FIGS. 2–4 to calculate the coefficients A1 and A2 of the characteristic polynomial det(zE−A') based on the pole arrangement scheme and calculate the control parameters F0–F7, thereby attaining the air-fuel ratio correction factor FAF. The following explains these programs shown in FIGS. 2–4.

The program of FIGS. 2 and 3 for the calculation of the air-fuel ratio correction factor is initiated at a predetermined calculation interval dt1. At step 101, it searches the intake air amount to model time constant table, and reads out the model time constant t which corresponds to the current intake air amount. Here, as shown in FIG. 2, model time constant $\tau$ is set smaller as the intake air amount increases. At the next step 102, it searches the model time constant to control gain table, and reads out the control gain $\omega$ which corresponds to the current model time constant $\tau$. Here, as shown in FIG. 2, control gain $\omega$ is set smaller as the model constant $\tau$ increases.

At the next step 103, it calculates the unknown coefficients A1 and A2 of the characteristic polynomial det(zE−A') by the following equations.

$$A1 = 2(\zeta \cdot \omega \cdot dt1 - 1)$$

$$A2 = 1 + (\omega \cdot dt1)^2 - 2\zeta \cdot \omega \cdot dt1$$

where dt1 is the interval of calculation of the air-fuel ratio correction factor FAF (will be called "first calculation period" hereinafter), and $\zeta$ is the damping factor which is fixed to 1. Accordingly, the above equations become as follows, by which the coefficients A1 and A2 are calculated from the values of control gain $\omega$ and first calculation period dt1.

$$A1 = 2(\omega \cdot dt1 - 1)$$

$$A2 = 1 + (\omega \cdot dt1)^2 - 2\omega \cdot dt1$$

Following the calculation of the coefficients A1 and A2, the operation proceeds to step 104 for executing the parameter renewing program shown in FIG. 4, by which the model parameters ap and bp and the control parameters F0–F7 are renewed. The parameter renewing program of FIG. 4 has its calculation interval dt2 set longer than the first calculation period dt1 for the air-fuel ratio correction factor FAF, e.g., a multiple of dt1: (dt2=dt1×integer).

The parameter renewing program of FIG. 4 starts, and it first calculates at step 104a the model parameters ap and bp by using the first calculation period dt1 and model parameter $\tau$ as follows.

$$ap = \exp(-dt1/\tau)$$

$$bp = 1 - ap$$

In the next step 104b, it calculates the control parameters F2–F7, F1 and F0 sequentially by using the model parameters ap and bp and the coefficients A1 and A2 as follows.

$$F2 = A1 + (ap+1)$$

$$F3 = A2 + (ap+1) \cdot F2 - ap$$

$$F4 = (ap+1) \cdot F3 - ap \cdot F2$$

$$F5 = (ap+1) \cdot F4 - ap \cdot F3$$

$$F6 = (ap+1) \cdot F5 - ap \cdot F4$$

$$F7 = (ap+1) \cdot F6 - ap \cdot F5$$

$$F1 = ap \cdot F7 / bp$$

$$F0 = \{-bp \cdot F1 + (ap+1) \cdot F7 - ap \cdot F6\}/bp$$

Following the calculation of the control parameters F2–F7, F1 and F0, the operation returns to step 105 to calculate the proportional compensation term pr(i), dead time compensation term dl(i) and integral compensation term I(i) which are used for the calculation of air-fuel ratio correction factor FAF as follows.

$$Pr(i) = F1 \phi(i)$$

$$dl(i) = F2 \cdot FAF(i-1) + F3 \cdot FAF(i-2) + F4 \cdot FAF(i-3) + F5 \cdot FAF(i-4) + F6 \cdot FAF(i-5) + F7 \cdot FAF(i-6)$$

$$I(i) = DI(i-1) + F0 \cdot \{\phi ref(i) - \phi(i)\}$$

where DI(i−1) is the latest value of the integral compensation term which has been renewed at step 108 or 109 as will be explained, φref(i) is the target fuel excess factor, and φ(i) is the current fuel excess factor.

Following the calculation of the compensation terms pr(i), dl(i) and I(i), the operation proceeds to step 106 in FIG. 3 to sum the previous air-fuel ratio correction factor FAF(i−1), current proportional compensation term pr(i) and current dead time compensation term dl(i), thereby attaining the modified integral compensation term Iinv.

$$Iinv=FAF(i-1)+pr(i)d1(i)$$

The modified integral compensation term Iinv is used so that the variation of air-fuel ratio correction factor FAF is continuous before and after the revision of the model parameters ap and bp and the control parameters F0–F7 in response to the variation of control model.

Following the calculation of the modified integral compensation term Iinv, the operation proceeds to step 107 to determine as to whether it is immediately after the renewal of the model parameters ap and bp and the control parameters F0–F7. If it is immediately after parameter renewal, the operation proceeds to step 108 to replace the latest integral compensation term DI(i) with the modified integral compensation term Iinv calculated in step 106. If it is not immediately after the renewal, it proceeds to step 109 to replace the latest integral compensation term DI(i) with the integral compensation term I(i) calculated in step 105.

The operation proceeds to step 110 to calculate the immediate air-fuel ratio correction factor FAF(i) by using the latest integral compensation term DI(i), proportional compensation term pr(i), and dead time compensation term dl(i) as follows.

$$FAF(i)=DI(i)-pr(i)-d1(i)$$

Here, the above-described steps 101–104 implement the role of the control parameter calculation means mentioned in the present invention, and the steps 105–110 implement the role of the air-fuel ratio correction factor calculation means mentioned in the present invention.

Figure 5:
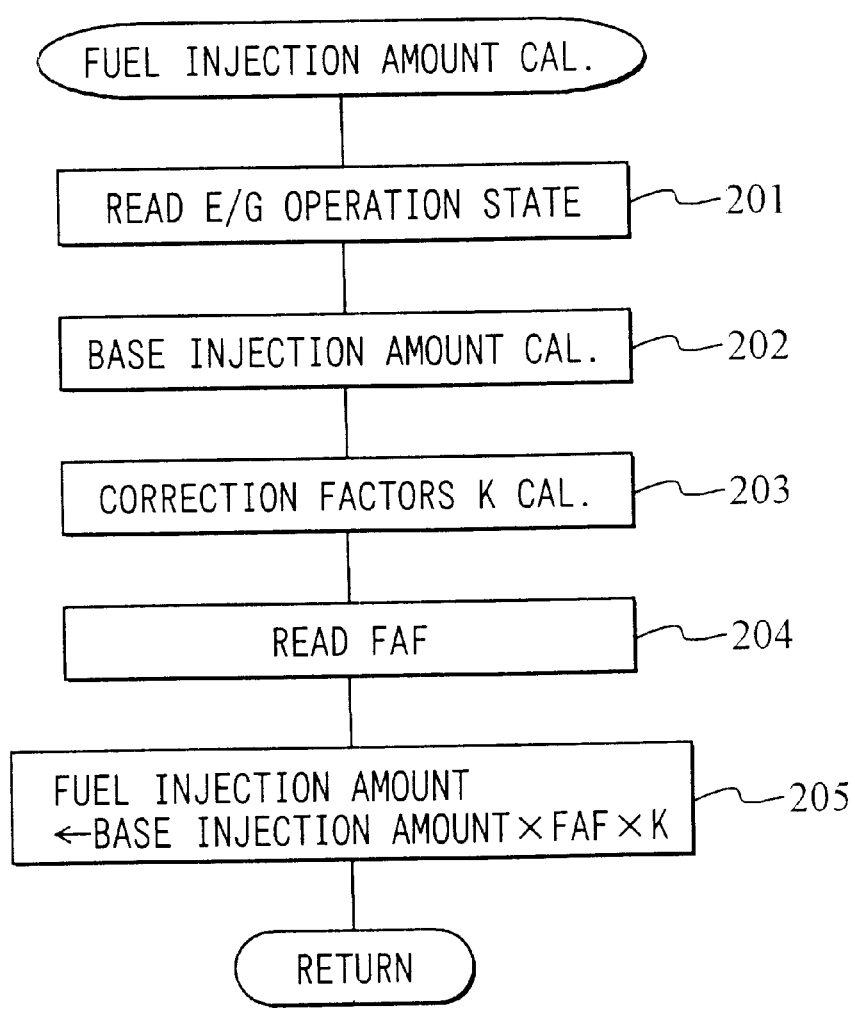
FIG. 5 is a flowchart showing the operation of the fuel injection amount calculation program.

On completion of the air-fuel ratio correction factor calculation programs in FIGS. 2 and 3, the fuel injection amount calculation program shown in FIG. 5 is initiated. The program starts, and it first reads the engine operation data including the intake air amount and engine speed at step 201, and next calculates the base fuel injection amount based on the mapping of a table in accordance with the engine operation data at step 202. At the next step 203, the program calculates miscellaneous correction factors K (e.g., the correction factor derived from the cooling water temperature and the correction factor derived from the acceleration), and at the next step 204, it reads the data of air-fuel ratio correction factor FAF which has been calculated at step 110 in FIG. 3. At the subsequent step 205, the program multiplies the air-fuel ratio correction factor FAF and correction factors K to the base fuel injection amount, thereby attaining the current fuel injection amount. In consequence, the air-fuel ratio of exhaust is controlled to become a purification window (close to the theoretical air-fuel ratio) of the catalytic device 22.

According to the above-described present embodiment, in which the coefficients A1 and A2 of the characteristic polynomial of the control model are calculated based on the pole arrangement in which the poles for the dead time d are 0, it is possible for the on-line real-time process to calculate the coefficients A1 and A2 of the characteristic polynomial to renew the control parameters F0–F7. In consequence, the control parameters F0–F7 can be varied continuously in accordance with the engine operation state, and the control accuracy of air-fuel ratio can be improved.

Moreover, in the present embodiment, unknown roots other than the poles for the dead time d are obtained in terms of a second-order lag system, with the damping factor $\zeta$ being fixed while only the control gain $\omega$ being varied, whereby it is advantageous in that the control response can be improved by making the control gain $\omega$ as large as possible while retaining the stability of control system.

Alternatively, the inventive controller may be designed to make both the control gain $\omega$ and damping factor $\zeta$ variable. The damping factor $\zeta$ is varied within the range of $\zeta \geq 1$ in accordance with the model time constant $\tau$ for example. The range of $\zeta < 1$, in which the transitional response becomes oscillatory due to deficient damping, is avoided, although a value of $\zeta$ less than 1, but in close vicinity to 1 (e.g., $\zeta > 0.9$), is permissible.

Further, in the present embodiment, the calculation interval dt2 for the model parameters and control parameters is set longer than the calculation interval dt1 for the air-fuel ratio correction factor in consideration of the slower variation of the model parameters and control parameters relative to the variation of air-fuel ratio correction factor. Thus, it is advantageous in that the model parameters and control parameters can be renewed properly while reducing the duty of calculation by lowering the frequency of parameter calculation.

However, it is possible to have a same value of the parameter calculation interval dt2 and calculation interval dt1 for the air-fuel ratio correction factor, and the intention of the present invention is fully attained.

When the engine operation state and model time constant do not much vary, in which case the model parameters and control parameters do not need to be varied, so that the model parameters and control parameters may be renewed in response to a variation of the engine operation state or model time constant in excess of a predetermined value. This scheme enables to renew the model parameters and control parameters properly while reducing the duty of calculation by lowering the frequency of parameter calculation.

Although, in the present embodiment, the normalized dead time d is set to be 6, it is arbitrary obviously.

Generally, for a dead time d set to be 2 or more, the number of coefficients of characteristic polynomial and the number of control parameters are equal to d plus 2, and the control parameters are expressed as follows, when the coefficients A3 through Ad+2 are all 0.

$$F2=A1+(ap+1)$$

$$F3=A2+(ap+1) \cdot F2-ap$$

$$F4=(ap+1) \cdot F3-ap \cdot F2$$

$$\vdots \quad \vdots \quad \vdots \quad \vdots \quad \vdots \quad \vdots$$

$$Fd+1=(ap+1) \cdot Fd-ap \cdot Fd-1$$

$$F1=ap \cdot Fd+1/bp$$

$$F0=\{-bp \cdot F1+(ap+1) \cdot Fd+1-ap\}/bp$$

For a dead time d set to be 1, the number of coefficients of characteristic polynomial and the number of control parameters are equal to 3, and the control parameters are expressed as follows, where the coefficient A3 is 0.

$$F2=A1+(ap+1)$$

$$F1=ap \cdot F2/bp$$

$$F0=\{A2-bp \cdot F1+(ap+1) \cdot F2-ap \cdot Fd\}/bp$$

Although in the present embodiment, the model time constant τ is variable in response to the amount of intake air, the model time constant τ may be calculated based on the mapping of a table in response to the engine speed and air-intake pipe pressure which are operational parameters comparable in significance to the amount of intake air.

The model time constant τ also varies in response to the quantity of fuel sticking on the inner wall of inlet ports and the like (wet value), and therefore the model time constant τ may be calculated based on two-dimensional mapping of a table in terms of the intake air amount and wet value. Here, the wet value can be inferred from the cooling water temperature. Otherwise, the model time constant τ may be calculated by using operational parameters other than the intake air amount and wet value.

In the present embodiment, the deviation of the detected air-fuel ratio from the target air-fuel ratio is assessed in terms of the deviation of the detected fuel excess factor from the target fuel excess factor at the calculation of the air-fuel ratio correction factor FAF. Alternatively, it may be assessed in terms of the deviation of the detected air excess factor from the target air excess factor, or the deviation of the detected air-fuel ratio from the target air-fuel ratio.

In the present embodiment, roots equal in number to the dead time of the control model are made 0. Alternatively, a scheme may be to make roots of n−1 or n−2 in number (n is the degree of characteristic polynomial) to be 0.

What is claimed is:

1. An air-fuel ratio controller for an internal combustion engine having a fuel injection valve for injecting fuel, air-fuel ratio detecting means for detecting an air-fuel ratio of exhaust gas, and controlling the air-fuel ratio of the exhaust gas to be close to a target air-fuel ratio based on state feedback by using a control model which simulates a control object ranging from the fuel injection valve down to the air-fuel ratio detecting means, said air-fuel ratio controller comprising:
   a control parameter calculation means for calculating control parameters based on coefficients of a characteristic polynomial of said control model and model parameters; and
   an air-fuel ratio correction factor calculation means for calculating an air-fuel ratio correction factor based on the control parameters, said air fuel ratio correction factor being used for feedback-based correction of fuel injection amount, wherein
   said control parameter calculation means calculates the coefficients of the characteristic polynomial based on a pole arrangement scheme which makes roots, which are equal in number to a dead time of the control model or equal in number to n−1 or n−2 (where n is the degree of the characteristic polynomial), to be zero.

2. An air-fuel ratio controller according to claim 1, wherein the control model is expressed in terms of a system having a dead time and a first-order lag, with the total number of roots being greater by two or one than the number of roots derived from the dead time.

3. An air-fuel ratio controller according to claim 2, wherein poles other than the poles of the dead time are attained by a formula which is expressed in terms of a system of second-order lag or first-order lag.

4. An air-fuel ratio controller according to claim 3, wherein one of variables ω and ζ of the second-order lag system is fixed.

5. An air-fuel ratio controller according to claim 1, wherein a calculation period of the control parameter is set longer than a calculation period of the air-fuel ratio correction factor.

6. An air-fuel ratio controller according to claim 1, wherein the control parameter calculation means calculates the model parameters based on a time constant of the control model.

7. An air-fuel ratio controller according to claim 1 wherein the control parameter calculation means renews the model parameters and the control parameters when an operational state or a time constant of the control model is changed by at least a predetermined value.

8. An air-fuel ratio controller according to claim 1, wherein poles other than the poles of the dead time are attained by a formula which is expressed in terms of a system of second-order lag or first-order lag.

9. An air-fuel ratio controller according to claim 8, wherein one of variables ω and ζ of the second-order lag system is fixed.

10. An air-fuel ratio controller for an internal combustion engine having a fuel injection valve for injecting fuel, air-fuel ratio detecting means for detecting an air-fuel ratio of exhaust gas, and controlling the air-fuel ratio of the exhaust gas to be close to a target air-fuel ratio based on sate feedback by using a control model which simulates a controlled object ranging from the fuel injection valve down to the air-fuel ratio detecting means, the air-fuel ratio controller comprising:
   a control parameter calculation means for calculating control parameters based on coefficients of a characteristic polynomial of the control model and model parameters; and
   an air-fuel ratio correction factor calculation means for calculating an air-fuel ratio correction factor based on the control parameters, the air-fuel ratio correction factor being used for feedback-based correction of fuel injection amount,
   wherein said control parameter calculation means calculates the coefficients of the characteristic polynomial based on equations which are obtained by a pole arrangement scheme in which roots corresponding to dead time of the control model are assumed zero.

11. An air-fuel ratio controller according to claim 10, wherein the control model is expressed in terms of a system having dead time and a first-order lag, with the total number of roots being greater by two or one than the number of roots derived from the dead time.

12. An air-fuel ratio controller according to claim 11, wherein poles other than the poles of the dead time are attained by a formula which is expressed in terms of a system of second-order lag or first-order lag.

13. An air-fuel ratio controller according to claim 12, wherein one of variables ω and ζ of the second-order lag system is fixed.

14. An air-fuel ratio controller according to claim 10, wherein a calculation period of the control parameter is set longer than a calculation period of the air-fuel ratio correction factor.

15. An air-fuel ratio controller according to claim 10, wherein the control parameter calculation means calculates the model parameters based on a time constant of the control model.

16. An air-fuel ratio controller according to claim 10, wherein the control parameter calculation means renews the model parameters and the control parameters when an operational state or a time constant of the control model is changed by at least a predetermined value.

17. An air-fuel ratio controller according to claim 10, wherein poles other than the poles of the dead time are attained by a formula which is expressed in terms of a system of second-order lag or first-order lag.

18. An air-fuel ratio controller according to claim 17, wherein one of variables $\omega$ and $\zeta$ of the second-order lag system is fixed.

19. An air-fuel ratio control method for an internal combustion engine having a fuel injection valve, air-fuel ratio detector, and air-fuel ratio controller based on state feedback using a control model which simulates a controlled object ranging from the fuel injection valve down to the air-fuel ratio detector, said air-fuel ratio control method comprising:

calculating control parameters based on coefficients of a characteristic polynomial of said control model and model parameters; and calculating an air-fuel ratio correction factor based on the control parameters, said air-fuel ratio correction factor being used for feedback-based correction of fuel injection amount, wherein said control parameter calculation calculates coefficients of the characteristic polynomial based on a pole arrangement scheme which makes roots, which are equal in number to a dead time of the control model or equal in number to n−1 or n−2 (where n is the degree of the characteristic polynomial), to be zero.

20. An air-fuel ratio control method according to claim 19 wherein the control model is expressed in terms of a system having a dead time and a first-order lag, with the total number of roots being greater by two or one than the number of roots derived from the dead time.

21. An air-fuel ratio control method according to claim 20 wherein poles other than the poles of the dead time are attained by a formula which is expressed in terms of a system of second-order lag or first-order lag.

22. An air-fuel ratio control method according to claim 21 wherein one of variables $\omega$ and $\zeta$ of the second-order lag system is fixed.

23. An air-fuel ratio control method according to claim 19 wherein a calculation period of the control parameter is set longer than a calculation period of the air-fuel ratio correction factor.

24. An air-fuel ratio control method according to claim 19 wherein the control parameter calculation calculates model parameters based on a time constant of the control model.

25. An air-fuel ratio control method according to claim 1, wherein the control parameter calculation renews the model parameters and the control parameters when an operational state or a time constant of the control model is changed by at least a predetermined value.

26. An air-fuel ratio control method according to claim 19 wherein poles other than the poles of the dead time are attained by a formula which is expressed in terms of a system of second-order lag or first-order lag.

27. An air-fuel ratio control method according to claim 26 wherein one of variables $\omega$ and $\zeta$ of the second-order lag system is fixed.

28. An air-fuel ratio control method for an internal combustion engine having a fuel injection valve, air-fuel ratio detector and air-fuel ratio controller based on state feedback by using a control model which simulates a controlled object ranging from the fuel injection valve down to the air-fuel ratio detector, the air-fuel ratio control method comprising:

calculating control parameters based on coefficients of a characteristic polynomial of the control model and model parameters; and calculating an air-fuel ratio correction factor based on the control parameters, the air-fuel ratio correction factor being used for feedback-based correction of fuel injection amount, wherein said control parameter calculation calculates the coefficients of the characteristic polynomial based on equations which are obtained by a pole arrangement scheme in which roots corresponding to dead time of the control model are assumed zero.

29. An air-fuel ratio control method according to claim 28 wherein the control model is expressed in terms of a system having dead time and a first-order lag, with the total number of roots being greater by two or one than the number of roots derived from the dead time.

30. An air-fuel ratio control method according to claim 29 wherein poles other than the poles of the dead time are attained by a formula which is expressed in terms of a system of second-order lag or first-order lag.

31. An air-fuel ratio control method according to claim 30 wherein one of variables $\omega$ and $\zeta$ of the second-order lag system is fixed.

32. An air-fuel ratio control method according to claim 28 wherein a calculation period of the control parameter is set longer than a calculation period of the air-fuel ratio correction factor.

33. An air-fuel ratio control method according to claim 28 wherein the control parameter calculation calculates the model parameters based on a time constant of the control model.

34. An air-fuel ratio control method according to claim 28 wherein the control parameter calculation renews the model parameters and the control parameters when an operational state or a time constant of the control model is changed by at least a predetermined value.

35. An air-fuel ratio control method according to claim 28 wherein poles other than the poles of the dead time are attained by a formula which is expressed in terms of a system of second-order lag or first-order lag.

36. An air-fuel ratio control method according to claim 35 wherein one of variables $\omega$ and $\zeta$ of the second-order lag system is fixed.

* * * * *